US012752537B2

(12) United States Patent
Tsujimura

(10) Patent No.: US 12,752,537 B2
(45) Date of Patent: Oct. 6, 2026

(54) LIQUID EJECTION DEVICE CONTROL METHOD AND LIQUID EJECTION DEVICE

(71) Applicant: SEIKO EPSON CORPORATION, Tokyo (JP)

(72) Inventor: Sawako Tsujimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 18/189,477

(22) Filed: Mar. 24, 2023

(65) Prior Publication Data

US 2023/0302803 A1 Sep. 28, 2023

(30) Foreign Application Priority Data

Mar. 25, 2022 (JP) ................................ 2022-049468

(51) Int. Cl.
*B41J 2/165* (2006.01)

(52) U.S. Cl.
CPC ....... *B41J 2/16535* (2013.01); *B41J 2/16526* (2013.01); *B41J 2002/1655* (2013.01)

(58) Field of Classification Search
None
See application file for complete search history.

(56) References Cited

U.S. PATENT DOCUMENTS 9,266,334 B2 * 2/2016 Ibe ....................... B41J 2/16535
10,137,691 B2 * 11/2018 Moscato .............. B41J 2/16526
2005/0275687 A1 * 12/2005 Furuichi .............. B41J 2/16529 347/43
2014/0035996 A1 * 2/2014 Gros ...................... B41J 2/1721 347/33
2021/0101387 A1 4/2021 Kato et al.
2021/0107285 A1 4/2021 Kanazawa et al.
2021/0237451 A1 8/2021 Yamaguchi
2022/0242128 A1 8/2022 Sato et al.
2022/0305792 A1 * 9/2022 Ishii ..................... B41J 2/16535

FOREIGN PATENT DOCUMENTS

JP 2021-059073 A 4/2021
JP 2021-059088 A 4/2021
JP 2021-185046 A 12/2021
JP 2022-119307 A 8/2022

* cited by examiner

*Primary Examiner* — Alejandro Valencia
(74) *Attorney, Agent, or Firm* — WORKMAN NYDEGGER

(57) ABSTRACT

A control method for a liquid ejection device including a liquid ejection head having a nozzle surface in which a plurality of nozzle arrays for ejecting liquid is formed and a wiping section which has an absorbent member, wherein the liquid ejection head and the wiping section are relatively movable in a scanning direction and in a sub-scanning direction; the nozzle arrays extend in the sub-scanning direction and are formed at predetermined intervals in the scanning direction; and the wiping section is set with, at different positions from each other, a wiping region in which the absorbent member wipes the nozzle surface and a receiving region in which the absorbent member receives liquid discharged from the liquid ejection head, the control method including performing flushing which includes ejecting liquid from each of the plurality of nozzle arrays at intervals in the scanning direction that are smaller than the predetermined intervals.

17 Claims, 11 Drawing Sheets

LIQUID EJECTION DEVICE CONTROL METHOD AND LIQUID EJECTION DEVICE

The present application is based on, and claims priority from JP Application Serial Number 2022-049468, filed Mar. 25, 2022, the disclosure of which is hereby incorporated by reference herein in its entirety.

BACKGROUND

1. Technical Field

The present disclosure relates to a liquid ejection device control method and a liquid ejection device.

2. Related Art

For example, there is a liquid jetting device, such as JP-A-2021-59088, which is an example of a liquid ejection device, for printing by jetting liquid from a liquid jetting section, which is an example of a liquid ejection head. The liquid jetting section has a nozzle surface on which nozzles for jetting liquid are formed.

The liquid ejection device includes a liquid collecting device, which is an example of a wiping section. The liquid collecting device is provided with a band-shaped member, which is an example of an absorbent member capable of absorbing liquid. The liquid collecting device performs wiping by using the band-shaped member to wipe a nozzle surface and receives, by the band-shaped member, liquid discharged by pressurized cleaning.

When the liquid discharged from the nozzle is also received by the absorbent member for wiping the nozzle surface, there is room for improvement in terms of efficient consumption of the band-shaped member.

SUMMARY

A liquid ejection device control method for overcoming the above-described problem is for a liquid ejection device including a liquid ejection head having a nozzle surface in which a plurality of nozzle arrays is formed by a plurality of nozzles for ejecting liquid and a wiping section which has an absorbent member configured to absorb liquid, wherein the liquid ejection head and the wiping section are relatively movable in a scanning direction and in a sub-scanning direction; the nozzle arrays extend in the sub-scanning direction and are formed at predetermined intervals in the scanning direction; and the wiping section is set with, at different positions from each other, a wiping region in which the absorbent member wipes the nozzle surface of the liquid ejection head during relative movement in the sub-scanning direction and a receiving region in which the absorbent member receives liquid discharged from the plurality of nozzle arrays, the control method including: performing flushing which includes ejecting liquid from each of the plurality of nozzle arrays in the receiving region at intervals in the scanning direction that are smaller than the predetermined intervals.

A liquid ejection device control method for overcoming the above-described problem is for a liquid ejection device including a liquid ejection head having a nozzle surface in which a plurality of nozzle arrays is formed by a plurality of nozzles for ejecting liquid; a wiping section which has an absorbent member configured to absorb liquid; and a pressurizing section configured to pressurize liquid in the nozzles of each of the plurality of nozzle arrays, wherein the liquid ejection head and the wiping section are relatively movable in a scanning direction and in a sub-scanning direction; the nozzle arrays extend in the sub-scanning direction and are formed at predetermined intervals in the scanning direction; and the wiping section is set with, at different positions from each other, a wiping region in which the absorbent member wipes the nozzle surface of the liquid ejection head during relative movement in the sub-scanning direction and a receiving region in which the absorbent member receives liquid discharged from the plurality of nozzle arrays, the control method including: performing pressurized discharge, the pressurized discharge including at a first pressurized discharge timing, discharging liquid to a first region of the absorbent member by using the pressurizing section to pressurize liquid in a plurality of nozzles of a nozzle array that is the target of a first pressurized discharge and at a second pressurized discharge timing, discharging liquid to a second region different from the first region of the absorbent member by using the pressurizing section to pressurize liquid in a plurality of nozzles of a nozzle array that is the target of a second pressurized discharge, wherein at least a part of the second region overlaps with the first region as viewed in the scanning direction; and the second region does not overlap with the first region as viewed in the sub-scanning direction.

A liquid ejection device to overcome the above-described problem is a liquid ejection device including: a liquid ejection head having a nozzle surface in which a plurality of nozzle arrays is formed by a plurality of nozzles for ejecting liquid; a wiping section which has an absorbent member configured to absorb liquid; and a control section, wherein the liquid ejection head and the wiping section are relatively movable in a scanning direction and in a sub-scanning direction; the nozzle arrays extend in the sub-scanning direction and are formed at predetermined intervals in the scanning direction; in the relative movement in the sub-scanning direction, the wiping section is set at a different position between a wiping region in which the absorbent member wipes the nozzle surface of the liquid ejection head and a receiving region in which the absorbent member receives liquid discharged from the plurality of nozzle arrays; and the control section causes ejection of liquid from each of the plurality of nozzle arrays in the receiving region at intervals in the scanning direction that are smaller than the predetermined intervals.

DESCRIPTION OF EMBODIMENTS

First Embodiment

Figure 1:
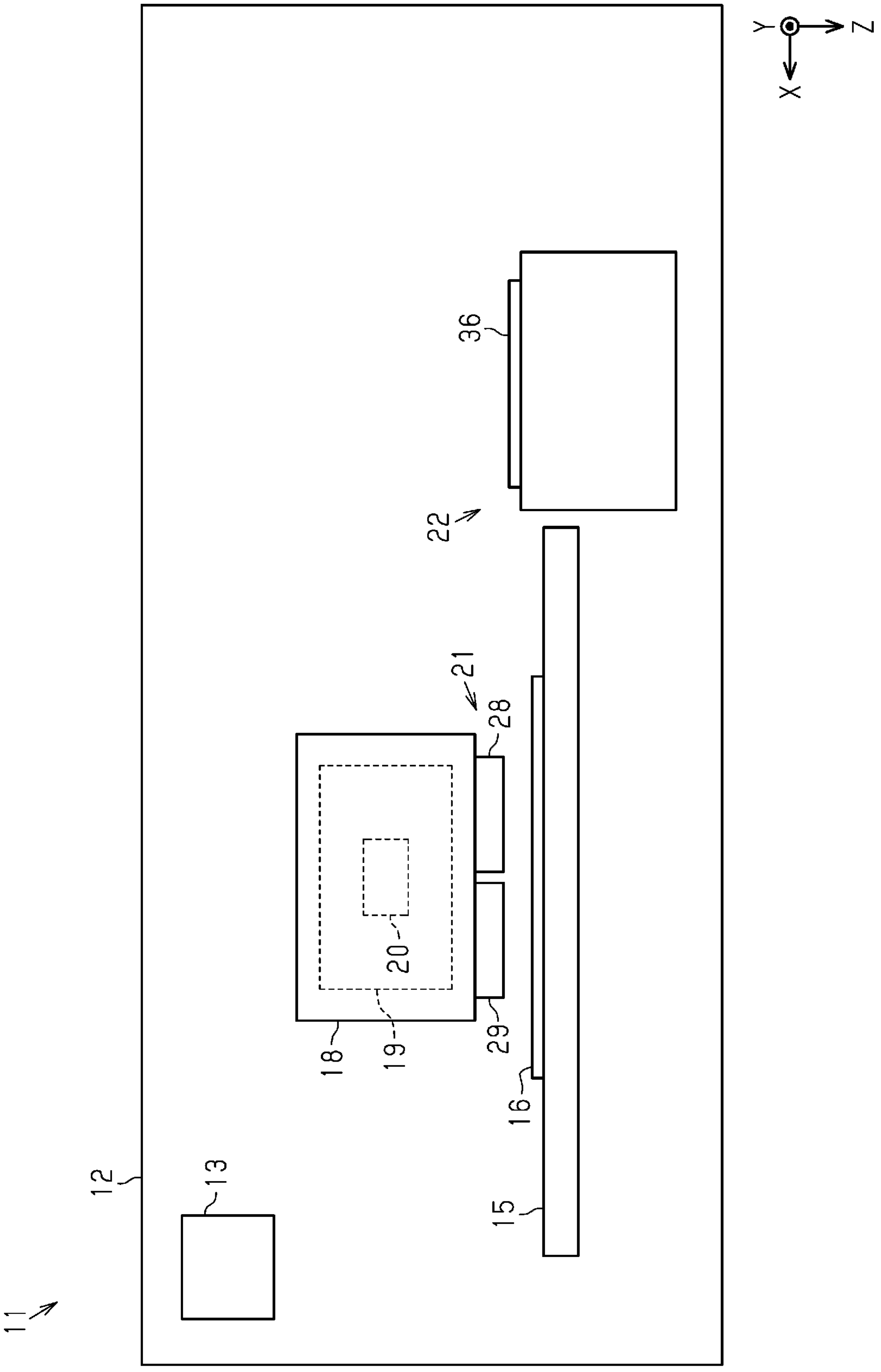
FIG. 1 is a schematic front view of a first embodiment of a liquid ejection device.

Hereinafter, a first embodiment of a liquid ejection device and a liquid ejection device control method will be described with reference to the drawings. The liquid ejection device is an ink jet type printer for printing by ejecting ink, which is an example of liquid, onto a medium such as sheets, fabric, vinyl, plastic parts, and metal parts.

In the drawings, assuming that a liquid ejection device 11 is placed on a horizontal surface, a direction of gravity is indicated by a Z-axis, and directions along the horizontal plane are indicated by a X-axis and a Y-axis. The X-axis, the Y-axis, and the Z-axis are orthogonal to each other. In the following description, a direction parallel to the Z-axis is also referred to as a vertical direction.

Liquid Ejection Device

As shown in FIG. 1, the liquid ejection device 11 may include a housing 12 and a control section 13.

The housing 12 accommodates various configurations of the liquid ejection device 11.

The control section 13 generally controls driving of each mechanism in the liquid ejection device 11, and controls various operations executed in the liquid ejection device 11.

The control section 13 can be configured as a circuit including α: one or more processors which execute various processes according to a computer program, β: one or more dedicated hardware circuits which execute at least some of various processes, or γ: a combination thereof. The hardware circuit is, for example, an application specific integrated circuit. The processor includes a CPU and memory, such as RAM and ROM, which stores program code or instructions configured to cause the CPU to perform processing. The memory, that is, the computer-readable medium, includes any readable medium that can be accessed by a general purpose or special purpose computer.

The liquid ejection device 11 may include a support section 15. The support section 15 is configured to support a medium 16. The support section 15 supports, for example, the medium 16.

The liquid ejection device 11 may include a carriage 18, a liquid container 19, a pressurizing section 20, a liquid ejection head 21, and a wiping section 22.

The carriage 18 may movably hold the liquid container 19, the pressurizing section 20, and the liquid ejection head 21. That is, the liquid container 19, the pressurizing section 20 and the liquid ejection head 21 may be mounted on the carriage 18.

The liquid container 19 is configured to accommodate liquid. The liquid container 19 is connected to the liquid ejection head 21. Liquid contained in the liquid container 19 is supplied to the liquid ejection head 21.

The pressurizing section 20 can supply pressurized liquid to the liquid ejection head 21. The pressurizing section 20 may perform pressurized discharge for discharging the liquid from the liquid ejection head 21 by pressurizing liquid in the liquid ejection head 21.

Figure 2:
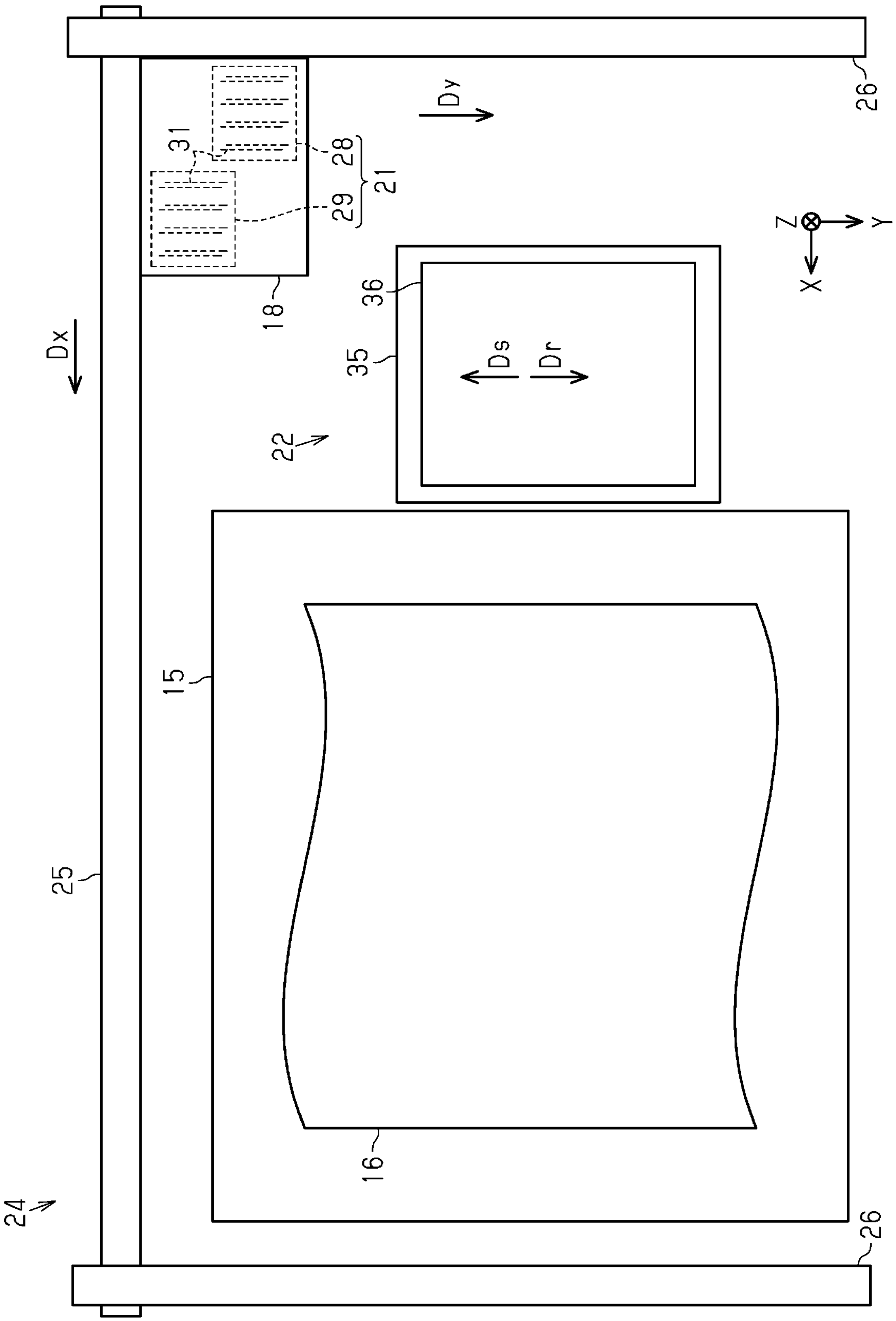
FIG. 2 is a schematic plan view of a movement mechanism.

As shown in FIG. 2, the liquid ejection device 11 may include a movement mechanism 24. The movement mechanism 24 may include a horizontal shaft 25 and a vertical shaft 26. The movement mechanism 24 of the present embodiment includes a pair of vertical shaft 26.

The horizontal shaft 25 may extend in a scanning direction Dx. A pair of vertical shafts 26 may be provided parallel to each other so as to extend in a sub-scanning direction Dy. The scanning direction Dx of present embodiment is parallel to the X-axis. The sub-scanning direction Dy of present embodiment is perpendicular to the X-axis and parallel to the Y-axis.

The movement mechanism 24 reciprocates the carriage 18 along the horizontal shaft 25. The movement mechanism 24 reciprocates the horizontal shaft 25 supporting the carriage 18 along the vertical shaft 26. Therefore, the movement mechanism 24 can move the liquid ejection head 21 mounted on the carriage 18 in the scanning direction Dx and the sub-scanning direction Dy. The liquid ejection head 21 and the wiping section 22 are relatively movable in the scanning direction Dx and the sub-scanning direction Dy.

The movement mechanism 24 may simultaneously move the liquid ejection head 21 in the scanning direction Dx and the sub-scanning direction Dy. That is, the movement mechanism 24 may move the liquid ejection head 21 obliquely with respect to the scanning direction Dx and the sub-scanning direction Dy so as to extend along the horizontal plane.

In the liquid ejection device 11, the liquid ejection head 21 records an image on the medium 16 by scanning the medium 16 with the carriage 18. The carriage 18 of present embodiment is configured not only to scan the medium 16 but also to move in a direction intersecting with the scanning direction. That is, the liquid ejection device 11 of the present embodiment is a so-called lateral printer.

The support section 15 may be configured not to move in the sub-scanning direction Dy and the direction opposite to the sub-scanning direction Dy, or may be configured to be movable.

Liquid Ejection Head

As shown in FIG. 2, the liquid ejection head 21 may include a first ejection section 28 and a second ejection section 29. The first ejection section 28 and the second ejection section 29 may be provided at positions different from each other in the scanning direction Dx so as to be spaced apart from each other in the scanning direction Dx. The first ejection section 28 and the second ejection section 29 may be provided at different positions in the sub-scanning direction Dy so as to partially overlap each other in the sub-scanning direction Dy. The second ejection section 29 may be located downstream in the scanning direction Dx, and upstream in the sub-scanning direction Dy, from the first ejection section 28.

The first ejection section 28 and the second ejection section 29 of present embodiment have the same configuration. Therefore, in the following description, the first ejection section 28 will be described, and the same reference numerals will be assigned to the same components to omit redundant description.

The first ejection section 28 is configured to eject liquid. The first ejection section 28 has a plurality of nozzles 31. Each nozzle 31 is capable of ejecting liquid. The first ejection section 28 records an image on the medium 16 by ejecting liquid while moving relative to the medium 16 supported by the support section 15.

Figure 3:
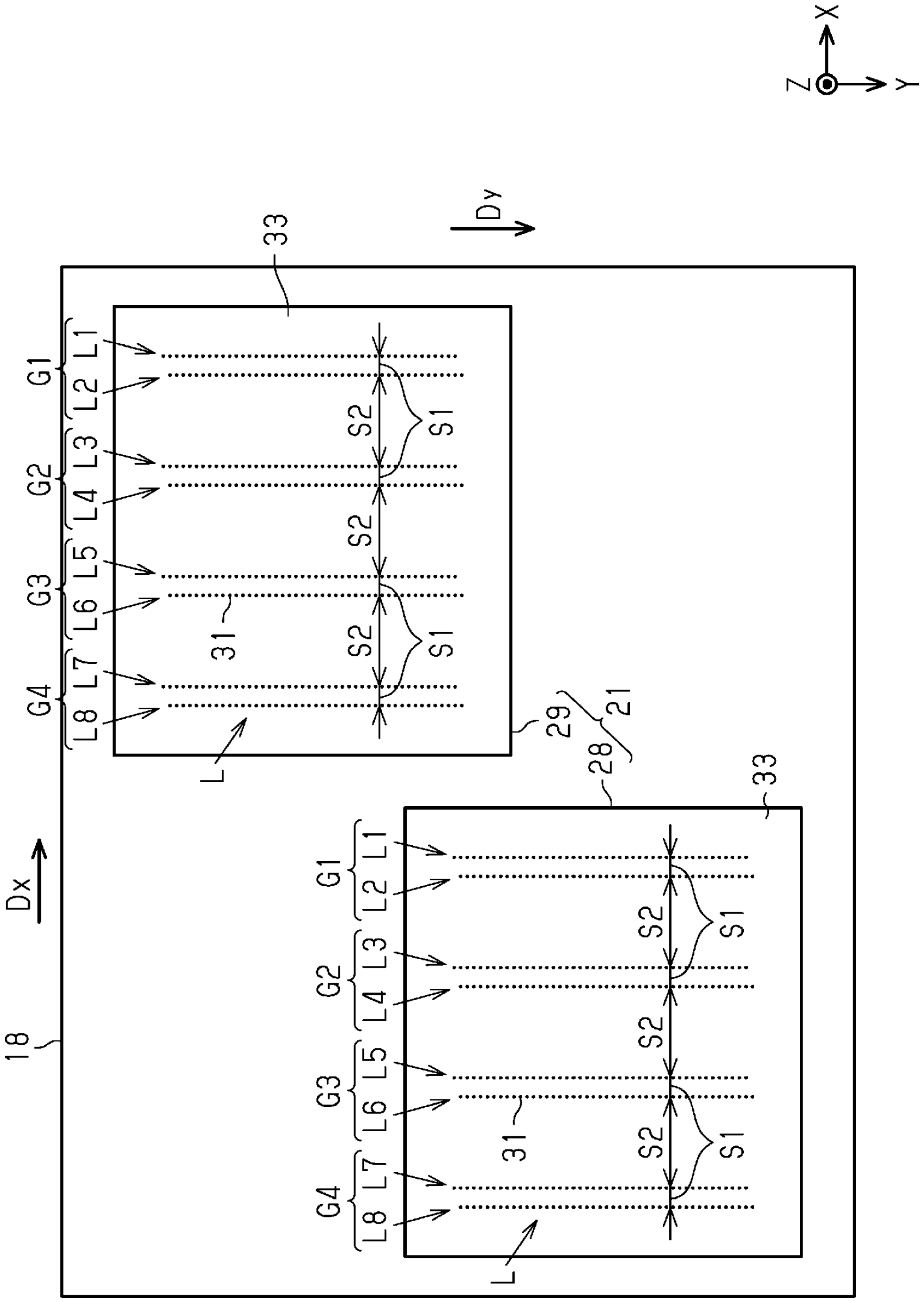
FIG. 3 is a schematic bottom view of a liquid ejection head.

As shown in FIG. 3, the first ejection section 28 has a nozzle surface 33. A plurality of nozzle arrays L is formed on the nozzle surface 33 by a plurality of nozzles 31. A first nozzle array L1 to an eighth nozzle array L8 are formed in the nozzle surface 33 of the present embodiment. One nozzle array L is formed by a plurality of nozzles 31 arranged in the sub-scanning direction Dy.

The nozzle arrays L extend in the sub-scanning direction Dy and are formed at a predetermined interval in the scanning direction Dx. The plurality of nozzle arrays L may be formed at equal intervals in the scanning direction Dx or at different intervals. For example, some of the nozzle arrays L in the first nozzle array L1 to the eighth nozzle array L8 may be arranged close to each other in the scanning direction Dx. In present embodiment, two nozzle arrays L that are arranged close to each other are referred to as a nozzle group.

The first ejection section 28 has a first nozzle group G1 to a fourth nozzle group G4. The first nozzle group G1 includes the first nozzle array L1 and the second nozzle array L2. The second nozzle group G2 includes the third nozzle array L3 and the fourth nozzle array L4. The third nozzle group G3 includes the fifth nozzle array L5 and the sixth nozzle array L6. The fourth nozzle group G4 includes the seventh nozzle array L7 and the eighth nozzle array L8.

The first nozzle group G1 to the fourth nozzle group G4 may be arranged at equal intervals in the scanning direction Dx. In the scanning direction Dx, a first interval S1 between nozzle arrays L arranged close to each other is smaller than a second interval S2 between nozzle groups. That is, the first interval S1 between the first nozzle array L1 and the second nozzle array L2 is smaller than the second interval S2 between the second nozzle array L2 and the third nozzle array L3. The first nozzle array L1 to the eighth nozzle array L8 are formed at a first interval S1, which is an example of a predetermined interval, or at a second interval S2, which is an example of a predetermined interval, in the scanning direction Dx.

The liquid ejection head 21 may eject the same type of liquid from all the nozzles 31. The liquid ejection head 21 may eject the same type of liquid in an arbitrary unit such as for each ejection section, for each nozzle group, or for each nozzle array L.

The liquid ejection head 21 may eject a plurality of kinds of liquids. Liquids of different kinds are, for example, inks of different colors. For example, the first ejection section 28 may eject inks of different colors such as magenta, yellow, cyan, black, light cyan, light magenta, green, and orange from the first nozzle array L1 to the eighth nozzle array L8, respectively. For example, the second ejection section 29 may eject clear ink from the first nozzle array L1 to the fourth nozzle array L4 and white ink from the fifth nozzle array L5 to the eighth nozzle array L8.

Wiping Section

As shown in FIG. 2, a wiping section 22 may be provided, for example, at a position adjacent to the support section 15. The wiping section 22 is configured to collect liquid from the liquid ejection head 21 as waste liquid. The waste liquid is liquid which does not contribute to an image recorded on the medium 16. The waste liquid is generated, for example, by maintenance of the liquid ejection head 21. The wiping section 22, for example, collects the waste liquid from the liquid ejection head 21, which is located immediately above the wiping section 22.

The maintenance of the liquid ejection head 21 includes, for example, flushing, cleaning, and wiping.

Flushing is an operation of appropriately ejecting liquid from the nozzle 31 in order to suppress clogging of the nozzle 31. Flushing is performed, for example, before, during, and after recording. When flushing is performed, the liquid ejection head 21 ejects liquid toward the wiping section 22.

"Cleaning" is an operation of forcibly discharging liquid from the nozzle 31 in order to discharge foreign matters, air bubbles, and the like in the liquid ejection head 21. In the present embodiment, pressurized discharge is performed as cleaning. "Pressurized discharge" is cleaning in which the pressurizing section 20 pressurizes liquid in the liquid ejection head 21, to forcibly discharge liquid from the nozzle 31. When pressurized discharge is performed, the liquid ejection head 21 discharges liquid toward the wiping section 22. Pressurized discharge is performed, for example, before and after recording. Pressurized discharge may be performed periodically during standby when recording is not performed.

The control section 13 may select one or more nozzle arrays L to perform pressurized discharge. Pressurized discharge may be performed for each of one or a plurality of nozzle arrays L. The pressurizing section 20 may be capable of pressurizing liquid in the nozzles 31 for each of the plurality of nozzle arrays L. The control section 13 may change a timing for pressurizing liquid, a length of time for pressurizing liquid, and a magnitude of pressure for pressurizing liquid for each of one or more nozzle arrays L.

Wiping is an operation of wiping the liquid ejection head 21 in order to remove liquid adhering to the liquid ejection head 21. Wiping is performed, for example, after cleaning. When wiping is performed, the liquid ejection head 21 is wiped by the wiping section 22.

Figure 4:
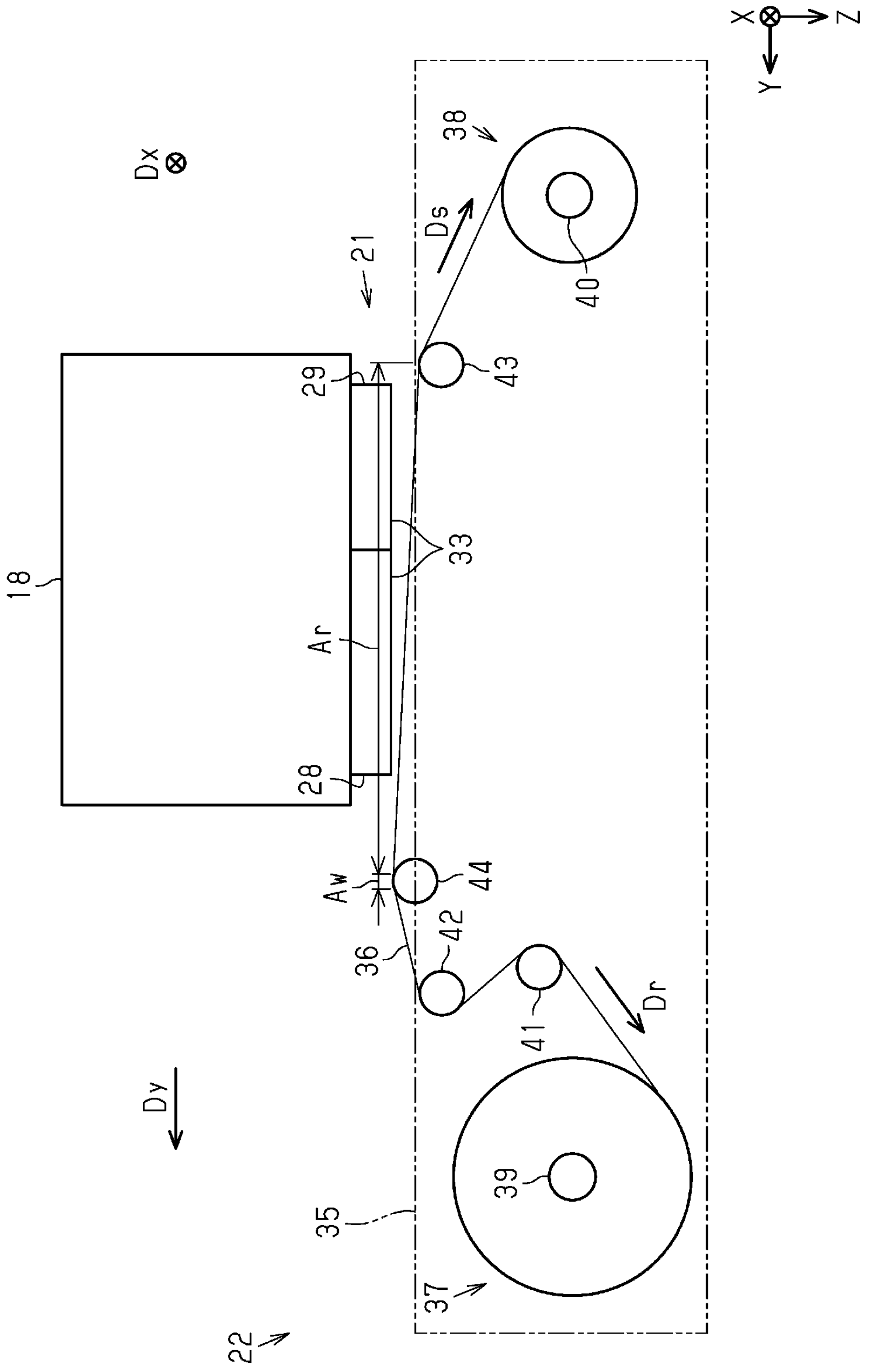
FIG. 4 is a schematic side view of a wiping section.

As shown in FIG. 4, the wiping section 22 may have a case 35, an absorbent member 36, a feed section 37, and a winding section 38. The feed section 37 has a feed shaft 39. The winding section 38 has a winding shaft 40. The wiping section 22 may have a first guide roller 41, a second guide roller 42, a third guide roller 43, and a pressing roller 44.

The case 35 may accommodate various components included in the wiping section 22. The case 35 may support the feed shaft 39, the winding shaft 40, the first guide roller 41 to the third guide roller 43, and the pressing roller 44 so as to extend in the scanning direction Dx. The case 35 is configured to be detachable from and attachable to the housing 12, for example. Therefore, the wiping section 22 can be replaced with respect to the liquid ejection device 11.

The absorbent member 36 is capable of absorbing liquid. The absorbent member 36 absorbs liquid discharged from the liquid ejection head 21. The absorbent member 36 absorbs waste liquid. The absorbent member 36 may be, for example, a cloth or a sponge. The absorbent member 36 is an elongated member. The absorbent member 36 may be provided to be movable in a feed direction Ds.

The feed section 37 may rotatably hold an unused absorbent member 36 wound in a roll shape. The feed section 37 unwinds and feeds the band-shaped absorbent member 36 by rotation of the feed shaft 39.

The winding section 38 may hold the used absorbent member 36. The winding section 38 winds the absorbent member 36 into a roll shape by rotation of the winding shaft 40. The winding section 38 is located upstream of the feed section 37 in the sub-scanning direction Dy.

The feed shaft 39 and the winding shaft 40 may be capable of forward rotation and reverse rotation. The feed shaft 39 and the winding shaft 40 when rotating forward feed the absorbent member 36 from the feed section 37 toward the winding section 38 in the feed direction Ds. The feed shaft 39 and the winding shaft 40 when rotating reversely feed the absorbent member 36 from the winding section 38 toward the feed section 37 in a return direction Dr. The return direction Dr is the direction opposite to the feed direction Ds. The feed direction Ds and the return direction Dr are directions along a path through which the absorbent member 36 passes.

The first guide roller 41, the second guide roller 42, the pressing roller 44 and the third guide roller 43 are provided in this order from the upstream side in the feed direction Ds. Each of the first guide roller 41 to the third guide roller 43 guides the wound absorbent member 36, thereby determining a path through which the absorbent member 36 passes.

The pressing roller 44 can press the absorbent member 36 against the liquid ejection head 21. The pressing roller 44 is located between the feed shaft 39 and the winding shaft 40 in the sub-scanning direction Dy and the feed direction Ds. The absorbent member 36 winds around the pressing roller 44. The pressing roller 44 may be configured to move up and down, for example. The pressing roller 44 may be pushed upward by, for example, a spring (not shown).

The pressing roller 44 can press the absorbent member 36 against the nozzle surface 33. In the liquid ejection head 21 of the present embodiment, the nozzle surface 33 is wiped by moving the liquid ejection head 21 downstream in the sub-scanning direction Dy with respect to the wiping section 22 in a state in which the absorbent member 36 is pressed against the nozzle surface 33.

In the wiping section 22, a wiping region Aw and a receiving region Ar are set at different positions. The wiping region Aw may be located downstream of the receiving region Ar in the sub-scanning direction Dy. The receiving region Ar may be located downstream of the wiping region Aw in the feed direction Ds.

The wiping region Aw is a region where the nozzle surface 33 of the liquid ejection head 21 is wiped by the absorbent member 36 in the relative movement in the sub-scanning direction Dy. The wiping region Aw is also a region pressed by the pressing roller 44. The wiping region Aw is also a region in which the absorbent member 36 is sandwiched between the pressing roller 44 and the nozzle surface 33.

The receiving region Ar is a region where the absorbent member 36 receives liquid discharged from the plurality of nozzle arrays L. The receiving region Ar of present embodiment is a region between the pressing roller 44 and the third guide roller 43.

Pressurized Discharge

Figure 5:
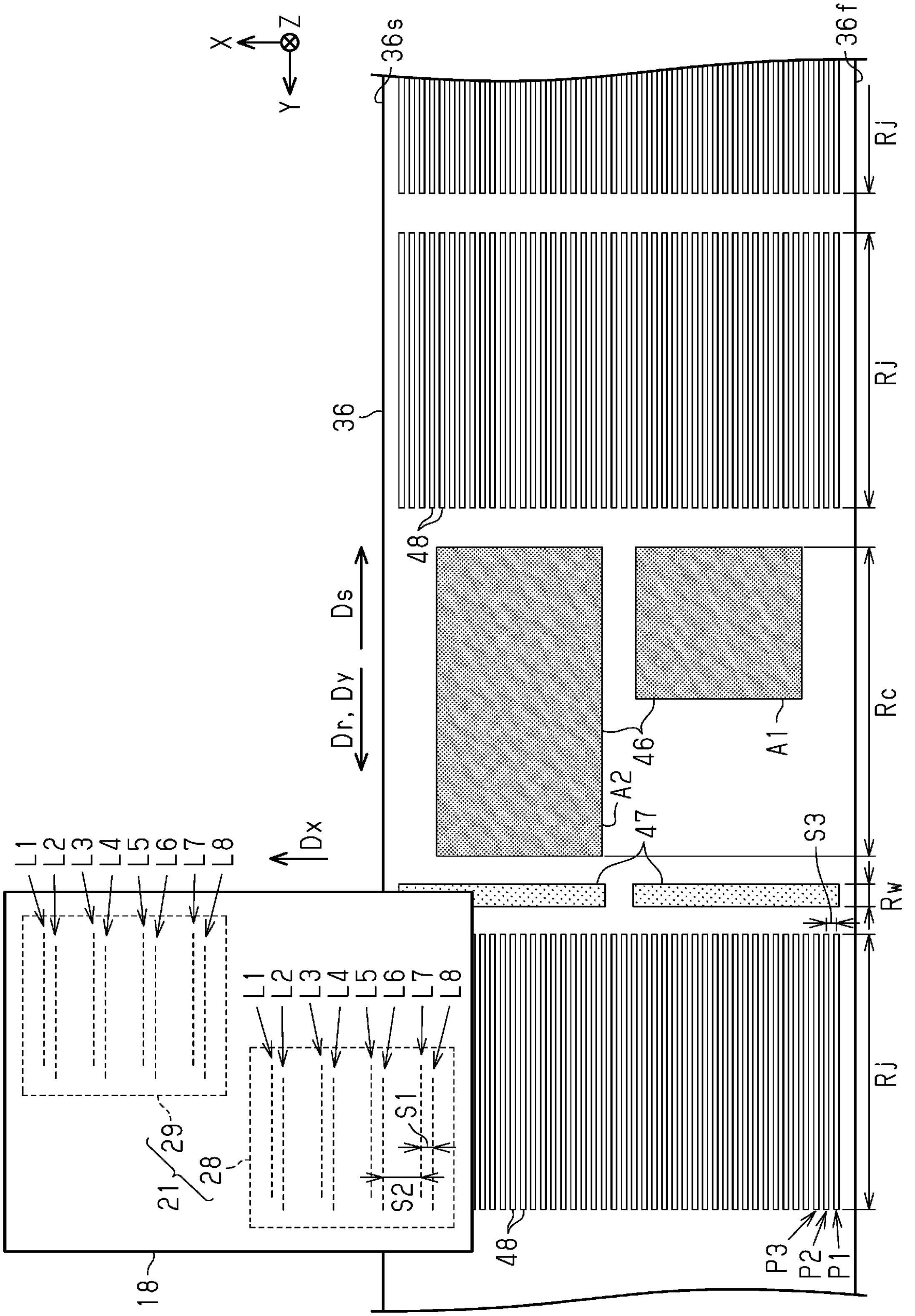
FIG. 5 is a schematic diagram in which an absorbent member that absorbed liquid extends in a plane shape.

As shown in FIG. 4, the control section 13 may perform pressurized discharge for discharging liquid from the nozzle 31 by pressurizing liquid in the nozzle 31 with the pressurizing section 20 in a state where the liquid ejection head 21 is located above the receiving region Ar. The control section 13 may perform pressurized discharge including a first pressurized discharge and a second pressurized discharge. The absorbent member 36 absorbs liquid discharged by pressurized discharge. In FIG. 5, the absorbent member 36 that absorbed liquid is shown in a flat shape in an extended state.

As shown in FIG. 5, at a first pressurized discharge timing, the control section 13 may discharge liquid into a first region A1 of the absorbent member 36 by pressurizing, by using the pressurizing section 20, liquid in the plurality of nozzles 31 constituting the nozzle array L, which is the target of the first pressurized discharge.

In the first pressurized discharge of the present embodiment, liquid is discharged from the first nozzle array L1 to the eighth nozzle array L8 of the first ejection section 28. The first region A1 is a region for absorbing liquid discharged with the first pressurized discharge. The control section 13 performs the first pressurized discharge in a state where the first region A1 is located in the receiving region Ar and the first ejection section 28 is located directly above the first region A1. Liquid discharged by the first pressurized discharge is absorbed by the absorbent member 36 to form a pressurizing trace 46.

At a second pressurized discharge timing, the control section 13 may discharge liquid into a second region A2, which is different from the first region A1, of the absorbent member 36 by using the pressurizing section 20 to pressurize liquid in the plurality of nozzles 31 constituting the nozzle array L that is the target of the second pressurized discharge.

In the second pressurized discharge of the present embodiment, liquid is discharged from the first nozzle array L1 to the eighth nozzle array L8 of the second ejection section 29. The second region A2 is a region for absorbing liquid discharged in association with the second pressurized discharge. The control section 13 performs the second pressurized discharge in a state where the second region A2 is located in the receiving region Ar and the second ejection section 29 is located directly above the second region A2. Liquid discharged by the second pressurized discharge is absorbed by the absorbent member 36 to form a pressurizing trace 46.

The control section 13 may perform at least one of the first pressurized discharge and the second pressurized discharge while feeding the absorbent member 36 in the feed direction Ds. In a case of feeding the absorbent member 36, the control section 13 may change at least one of an amount of feeding the absorbent member 36 and a speed at which the absorbent member 36 is fed. For example, when an amount of liquid to be discharged by pressurization from the nozzle 31 is large, an amount of the absorbent member 36 to be fed may be increased. For example, when the discharge speed of liquid discharged from the nozzle 31 by pressurization is fast, the speed at which the absorbent member 36 is fed may be increased. The pressurizing trace 46 formed by the first pressurized discharge and the pressurizing trace 46 formed by the second pressurized discharge may have different sizes in the feed direction Ds.

At least a part of the second region A2 may overlap with the first region A1 as viewed in the scanning direction Dx. The second region A2 may not overlap with the first region A1 as viewed in the sub-scanning direction Dy. The first region A1 and the second region A2 may be arranged in the scanning direction Dx.

The control section 13 may perform pressurized discharge from a first end **36*f* side, which is an example of one end of the absorbent member 36 in the scanning direction Dx, to a second end 36*s*, which is an example of the other end of the absorbent member 36. Specifically, in the scanning direction Dx, a size of a margin from the first end 36*f* to the first region A1 may be smaller than the sizes of the first region A1 and the second region A2. In the scanning direction Dx, the size of a margin from the second region A2 to the second end 36*s* may be smaller than the sizes of the first region A1 and the second region A2. The margin is a portion of the absorbent member 36** that does not absorb liquid.

Wiping

The control section 13 may perform wiping after performing pressurized discharge. The control section 13 may move the absorbent member 36 in the return direction Dr, which is opposite to the feed direction Ds, after discharging liquid from the plurality of nozzles 31 to the absorbent member 36. The control section 13 moves the absorbent member 36 in the return direction Dr while keeping the liquid ejection head 21 positioned in the receiving region Ar. The control section 13 stops movement of the absorbent member 36 before the pressurizing trace 46 reaches a wiping region Aw. That is, the control section 13 moves an unused region of the absorbent member 36, which has not received liquid, to the wiping region Aw.

Thereafter, the control section 13 moves the liquid ejection head 21 in the sub-scanning direction Dy to pass through the wiping region Aw. The wiping section 22 wipes the nozzle surface 33 at the wiping region Aw.

The absorbent member 36 absorbs liquid adhered to the nozzle surface 33 by wiping the nozzle surface 33. Liquid forms a wiping trace 47 by being absorbed by the absorbent member 36.

Flushing

When flushing is performed after wiping or pressurized discharge, the control section 13 may move the absorbent member 36 in the feed direction Ds. The control section 13 may move the wiping trace 47 and the pressurizing trace 46 downstream in the feed direction Ds from a first position P1 and a second position P2 where flushing is to be performed.

The control section 13 may perform flushing in which liquid is ejected to a position that does not overlap, as viewed in the scanning direction Dx, with the first region A1 and the second region A2. Liquid discharged by flushing is absorbed by the absorbent member 36 to form an ejection trace 48. The ejection trace 48 may be formed at a position different from the pressurizing trace 46 in the sub-scanning direction Dy.

The liquid ejection head 21 may perform flushing by ejecting liquid onto a stopped absorbent member 36 while moving in the scanning direction Dx. Specifically, the control section 13 moves the liquid ejection head 21 in the scanning direction Dx so that the liquid ejection head 21 passes through the receiving region Ar. At this time, the control section 13 controls a timing at which liquid is ejected from each nozzle array L of the first ejection section 28 and the second ejection section 29.

The control section 13 performs flushing in which liquid is ejected from each of the plurality of nozzle arrays L into the receiving region Ar at intervals that are smaller in the scanning direction Dx than are the intervals between the nozzle arrays L. The control section 13 performs flushing in which liquid is ejected to a position that does not overlap with the first region A1 and the second region A2 as viewed in the scanning direction Dx.

The control section 13 may perform flushing by ejecting liquid to the same position of the absorbent member 36 from at least two nozzle arrays L among the plurality of nozzle arrays L. The control section 13 may cause liquid to be ejected from the plurality of nozzle arrays L to overlap on the first position P1 in the receiving region Ar.

After an amount of liquid ejected to the first position P1 reaches the threshold, the control section 13 may cause the plurality of nozzle arrays L to eject liquid to overlap on the second position P2, which is different from the first position P1 in the scanning direction Dx. The threshold is an amount of liquid that can be absorbed by the absorbent member 36 at that position.

For example, in a case where the threshold is reached by ejecting liquid from two nozzle arrays L, then the control section 13 may cause liquid to be ejected from the first nozzle array L1 and the second nozzle array L2 of the first ejection section 28 and of the second ejection section 29 to the first position P1. The control section 13 may cause liquid to be ejected from the third nozzle array L3 and the fourth nozzle array L4 of the first ejection section 28 and of the second ejection section 29 to the second position P2.

For example, in a case where the threshold is reached by ejecting liquid from three nozzle arrays L, then the control section 13 may eject liquid from the first nozzle array L1 to the third nozzle array L3 of the first ejection section 28 and of the second ejection section 29 to the first position P1. The control section 13 may eject liquid from the fourth nozzle array L4 of the first ejection section 28 and of the second ejection section 29 to the second position P2. In next flushing, the control section 13 may cause liquid to be ejected from the first nozzle array L1 and the second nozzle array L2 of the first ejection section 28 and of the second ejection section 29 to the second position P2. The control section 13 may cause liquid to be ejected from the third nozzle array L3 and the fourth nozzle array L4 of the first ejection section 28 and of the second ejection section 29 to the third position P3. The third position P3 is different from the second position P2 in the scanning direction Dx.

The ejection traces 48 may be formed at equal intervals in the scanning direction Dx. A third interval S3 between the first position P1 and the second position P2 is smaller in the scanning direction Dx than is the first interval S1 or the second interval S2.

The control section 13 may perform flushing from the first end 36*f* side to the second end 36*s* side in the scanning direction Dx of the absorbent member 36. Specifically, the size of the margin from the first end 36*f* to the ejection trace 48 closest to the first end 36*f* may be smaller in the scanning direction Dx than is the total size of the dimension of one ejection trace 48 and the third interval S3. The size of the margin from the ejection trace 48 closest to the second end 36*s* to the second end 36*s* may be smaller in the scanning direction Dx than is the total size of the dimension of one ejection trace 48 and the third interval S3.

When flushing is performed up to the second end 36*s* side of the absorbent member 36, then the control section 13 may perform flushing by moving the absorbent member 36 in the feed direction Ds. A plurality of ejection traces 48 formed from the first end 36*f* side to the second end 36*s* side may be formed in the absorbent member 36 in the sub-scanning direction Dy.

Operations of First Embodiment

The operations of present embodiment will be described.

As shown in FIG. 5, the absorbent member 36 for wiping the nozzle surface 33 receives liquid that was discharged from the nozzles 31 by flushing and pressurized discharge. In the absorbent member 36 that received liquid, at least two of one or more pressurizing range Rc, one or more wiping range Rw, and one or more ejection range Rj are arranged in the feed direction Ds.

One or more pressurizing traces 46 arranged in the scanning direction Dx may be located in the pressurizing range Rc. One or more wiping traces 47 arranged in the scanning direction Dx may be located in the wiping range Rw. One or more ejection traces 48 arranged in the scanning direction Dx may be located in the ejection range Rj.

Effects of First Embodiment

The effects of present embodiment will be described.

(1) The absorbent member 36 for wiping the nozzle surface 33 receives liquid that was discharged by flushing. The liquid ejection head 21 performs flushing by ejecting liquid at intervals smaller than the intervals of the plurality of nozzle arrays L. Therefore, the absorbent member 36 can be consumed more efficiently than when liquid is ejected at intervals equal to or greater than the intervals between the nozzle arrays L.

(2) The liquid ejection device 11 ejects liquid from the plurality of nozzle arrays L to overlap on the first position P1. That is, the liquid ejection head 21 performs flushing at an interval at which liquid is ejected from the plurality of nozzle arrays L of zero. Therefore, the absorbent member 36 can be consumed more efficiently than when liquid is ejected from the plurality of nozzle arrays L at intervals opened between the nozzle arrays L. After liquid that was ejected to the first position P1 reaches the threshold, the liquid ejection head 21 ejects liquid to the second position P2. Therefore, it is possible to reduce possibility that an amount of liquid more than an amount that can be received at the first position P1 is ejected to the first position P1.

(3) The absorbent member 36 receives liquid discharged by pressurized discharge. Liquid is discharged to the first region A1 at the first pressurized discharge timing. Liquid is discharged to the second region A2 at the second pressurized discharge timing. Since the first region A1 and the second region A2 overlap at least partially as viewed in the scanning direction Dx, the absorbent member 36 can be consumed more efficiently than when they do not overlap. Since the first region A1 and the second region A2 do not overlap each other as viewed in the sub-scanning direction Dy, it is possible to reduce the possibility that a region will be generated in which a receivable amount or more of liquid is discharged.

(4) Pressurized discharge is performed while the absorbent member 36 is being fed in the feed direction Ds. Since the position where the absorbent member 36 receives liquid changes, it is possible to suppress liquid from overflowing from the absorbent member 36 due to the absorbent member 36 not being able to completely absorb the liquid.

(5) Flushing is performed at a position not overlapping with the first region A1 and the second region A2 as viewed in the scanning direction Dx. Therefore, a region where liquid is ejected by flushing and a region where liquid is discharged by pressurized discharge can be separated by a simple control.

(6) Flushing is performed from the first end 36*f* side to the second end 36*s* side in the scanning direction Dx of the absorbent member 36. Therefore, the absorbent member 36 can be efficiently consumed as compared with the case where flushing is performed in a part of the scanning direction Dx.

(7) Pressurized discharge is performed from the first end 36*f* side to the second end 36*s* side in the scanning direction Dx of the absorbent member 36. Therefore, the absorbent member 36 can be efficiently consumed as compared with the case where pressurized discharge is performed in a part of the scanning direction Dx.

(8) An unused region of the absorbent member 36 is moved to the wiping region Aw to wipe the nozzle surface 33. Since the unused region of the absorbent member 36 can be reduced, the absorbent member 36 can be efficiently consumed.

(9) The absorbent member 36 for wiping the nozzle surface 33 receives liquid discharged by pressurized discharge. Liquid is discharged to the first region A1 at the first pressurized discharge timing. Liquid is discharged to the second region A2 at the second pressurized discharge timing. Since the first region A1 and the second region A2 do not overlap each other as viewed in the sub-scanning direction Dy, it is possible to reduce the possibility that a region will be generated in which a receivable amount or more of liquid is discharged. Since the first region A1 and the second region A2 overlap at least partially as viewed in the scanning direction Dx, the absorbent member 36 can be consumed more efficiently than when they do not overlap.

(10) The absorbent member 36 for wiping the nozzle surface 33 receives liquid discharged by ejecting from the plurality of nozzle arrays L. The control section 13 ejects liquid at intervals smaller than the intervals of the plurality of nozzle arrays L. Therefore, the absorbent member 36 can be consumed more efficiently than when liquid is ejected at intervals equal to or larger than the intervals between the nozzle arrays L.

Second Embodiment

Next, a second embodiment of a liquid ejection device and a liquid ejection device control method will be described with reference to the drawings. The second embodiment is different from the first embodiment in a position where the ejection trace is formed on the absorbent member. Since other points are substantially the same as those of the first embodiment, the same components are denoted by the same reference numerals, and redundant explanations are omitted.

Figure 6:
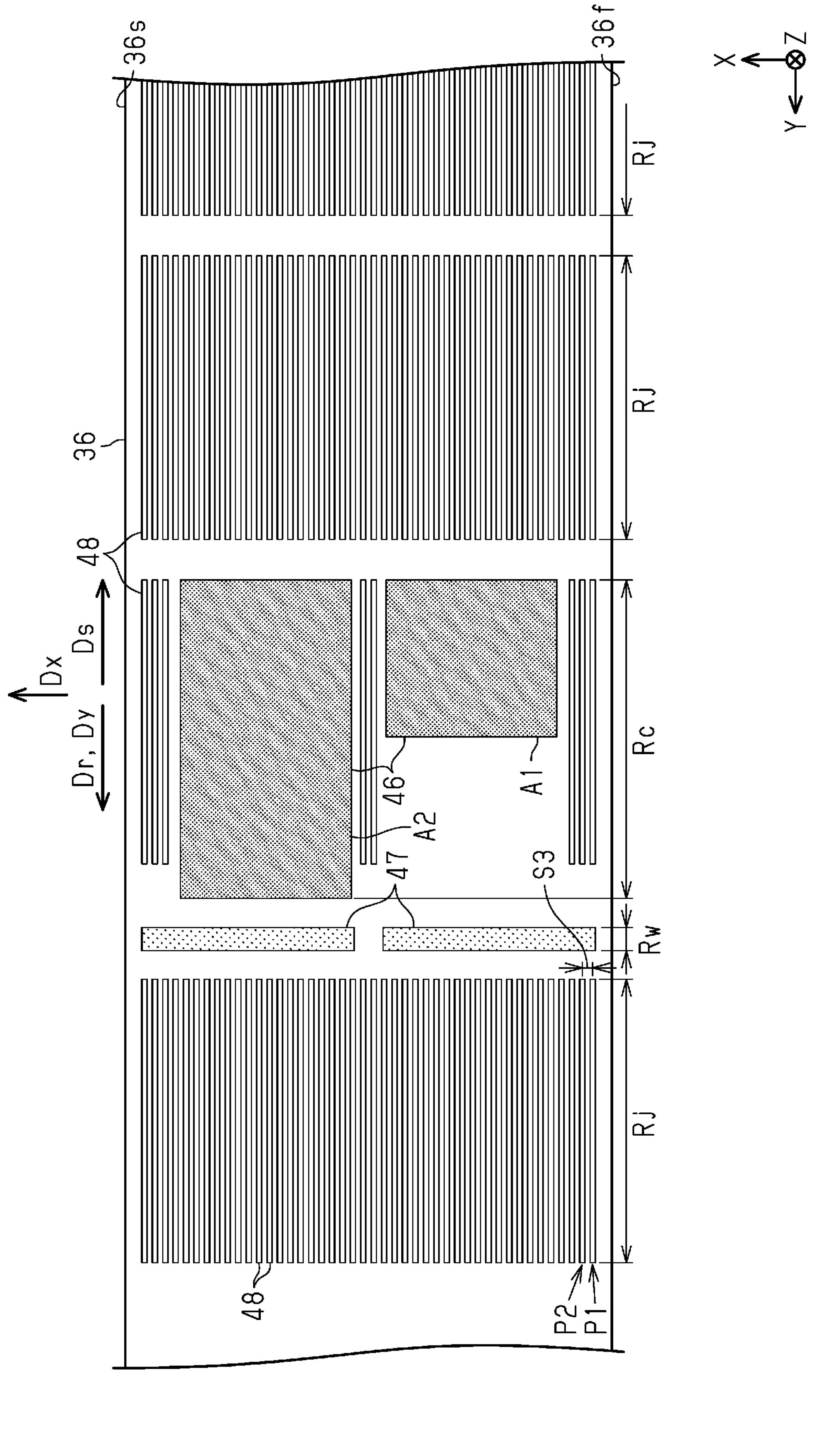
FIG. 6 is a schematic diagram of the absorbent member in which liquid is absorbed according to a control method of a second embodiment.

As shown in FIG. 6, flushing may be performed in which liquid is ejected to a position overlapping at least one of the first region A1 and the second region A2 as viewed in the scanning direction Dx. The ejection trace 48 and the pressurizing trace 46 may overlap in the sub-scanning direction Dy and the feed direction Ds. The control section 13 may perform flushing and pressurized discharge from the first end 36*f* side to the second end 36*s* side in the scanning direction Dx of the absorbent member 36.

Operations of Second Embodiment

The operations of present embodiment will be described. The pressurizing range Rc may receive liquid discharged by flushing in addition to liquid discharged by pressurization. The ejection trace 48 may be formed together with the pressurizing trace 46 in the pressurizing range Rc.

Effects of Second Embodiment

The effects of present embodiment will be described.

(11) Flushing is performed at a position overlapping at least one of the first region A1 and the second region A2 as viewed in the scanning direction Dx. Therefore, the absorbent member 36 can be consumed more efficiently than in the case where flushing is performed at a position not overlapping with the first region A1 and the second region A2 as viewed in the scanning direction Dx.

(12) Flushing and pressurized discharge are performed from the first end 36*f* side to the second end 36*s* side in the scanning direction Dx of the absorbent member 36. Therefore, the absorbent member 36 can be efficiently consumed as compared with the case where pressurized discharge is performed in a part of the scanning direction Dx.

Modifications

The present embodiment can be modified as follows. The present embodiment and the following modifications can be implemented in combination with each other within a range that is not technically contradictory.

First Modification

Figure 7:
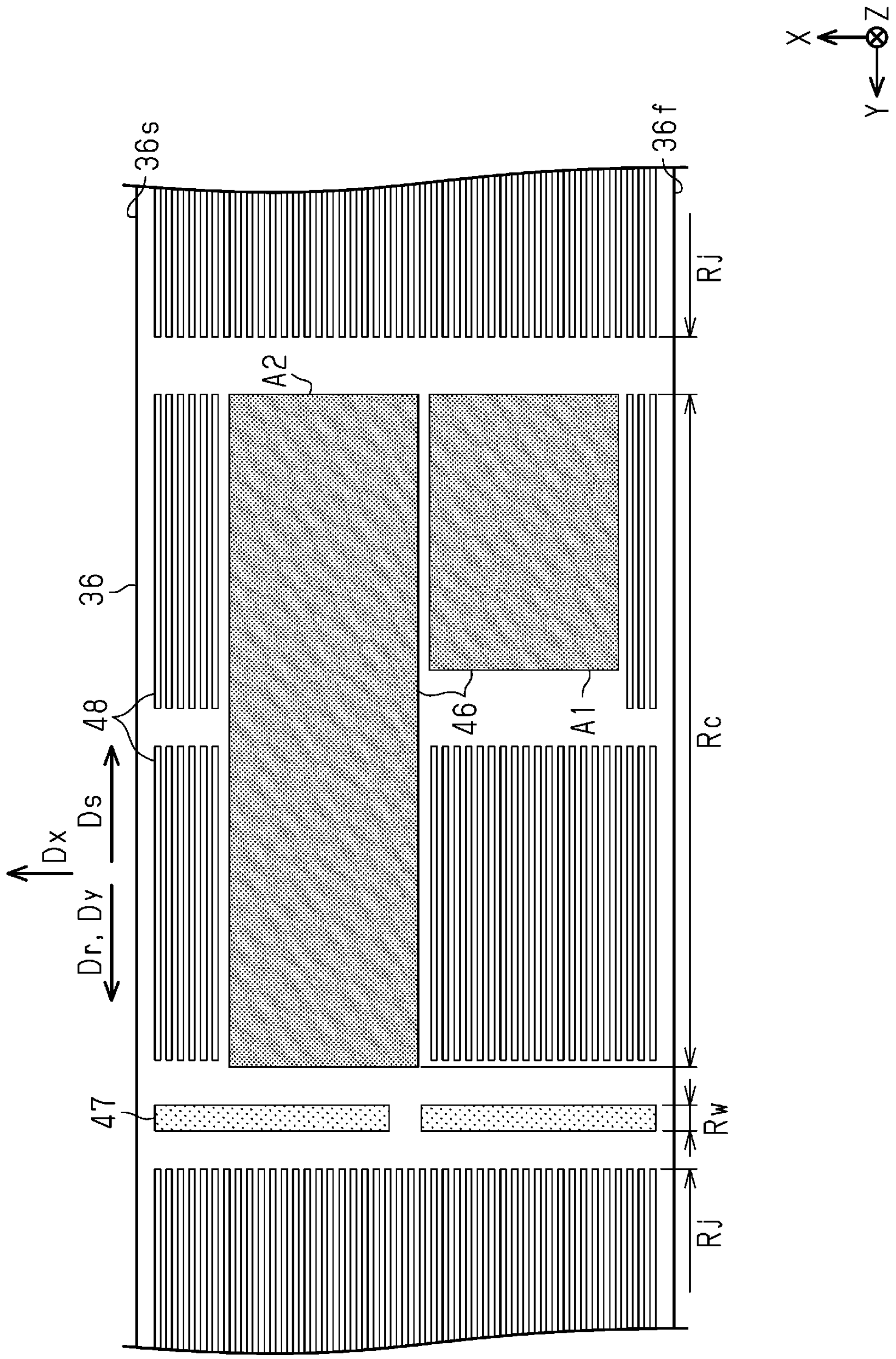
FIG. 7 is a schematic diagram of the absorbent member in which liquid is absorbed according to a control method of a first modification.

As shown in FIG. 7, when the size of the pressurizing range Rc in the feed direction Ds is twice or more than the ejection traces 48, the control section 13 may perform flushing so that the ejection traces 48 are arranged in the feed direction Ds in the pressurizing range Rc.

Second Modification

Figure 8:
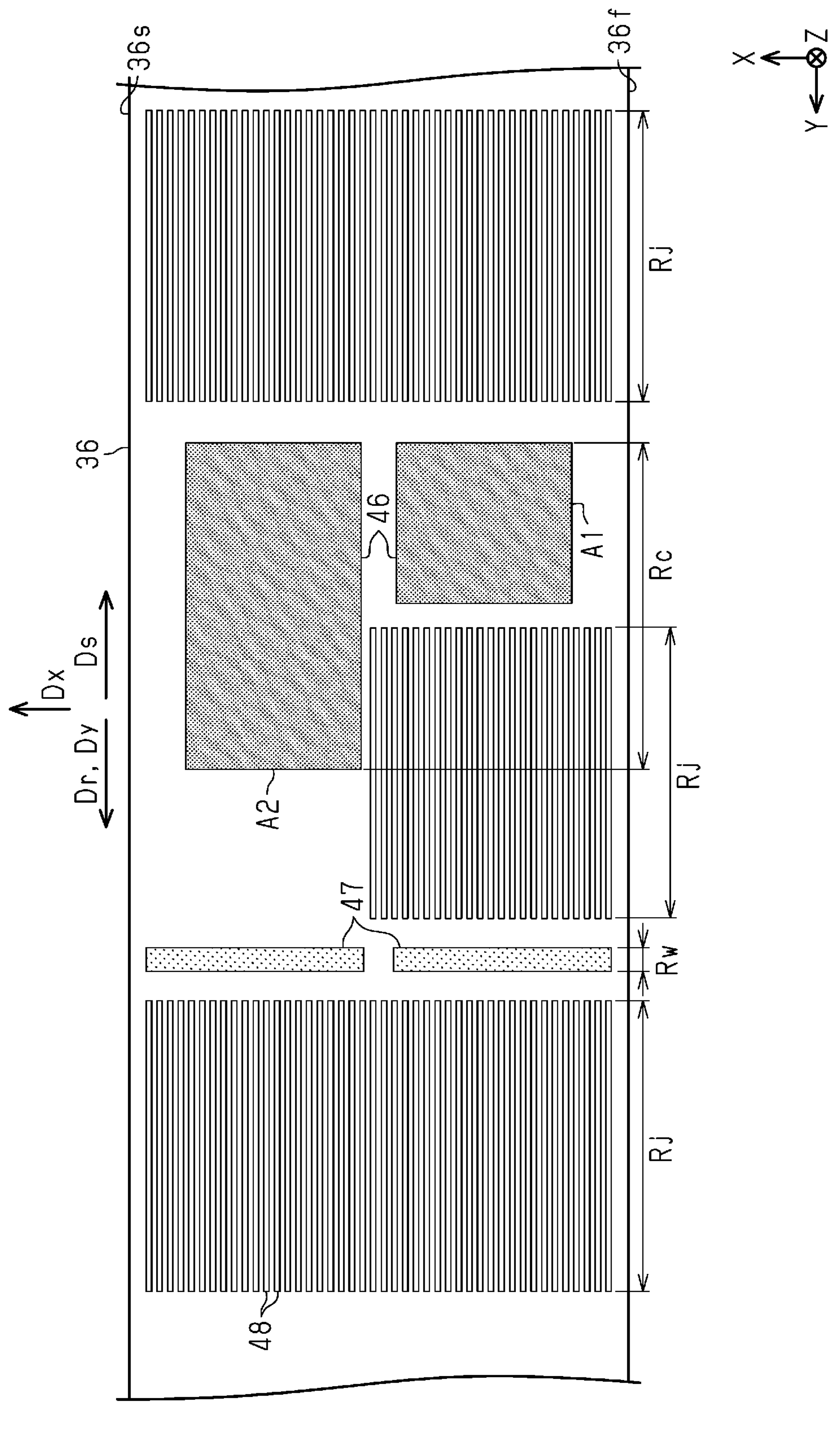
FIG. 8 is a schematic diagram of an absorbent member in which liquid is absorbed according to a control method of a second modification.

As shown in FIG. 8, a part of the ejection range Rj may overlap with the pressurizing range Rc in the feed direction Ds.

Third Modification

Figure 9:
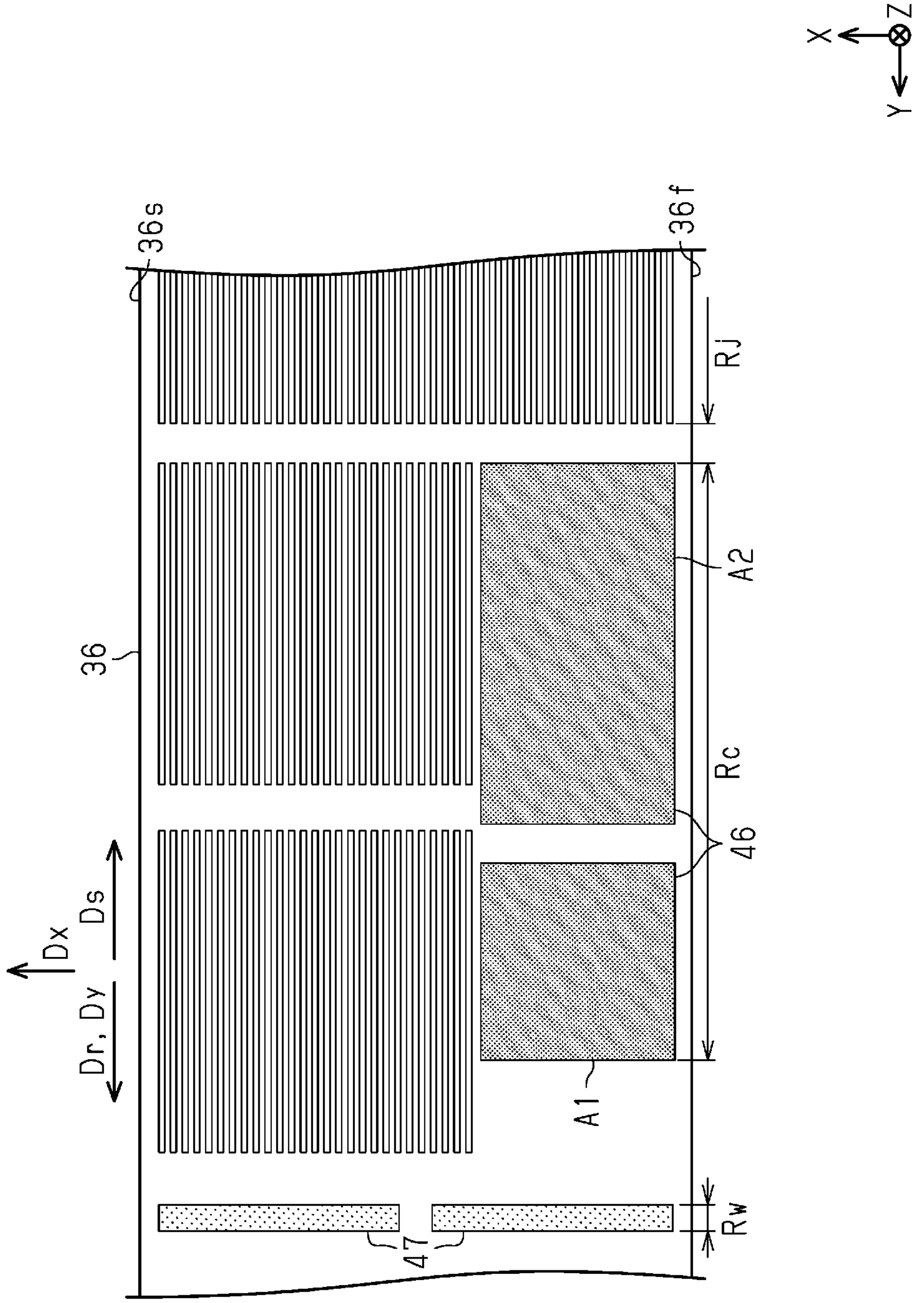
FIG. 9 is a schematic diagram of an absorbent member in which liquid is absorbed according to a control method of a third modification.

As shown in FIG. 9, the first region A1 and the second region A2 may be arranged in the feed direction Ds. The control section 13 may perform the second pressurized discharge in which the pressurizing trace 46 is formed in the second region A2 with liquid discharged from the second ejection section 29 by pressurization. When the second pressurized discharge is finished, the control section 13 may stop the pressurization of the second ejection section 29 and move the liquid ejection head 21 in the scanning direction Dx. The control section 13 may move the liquid ejection head 21 so that the first ejection section 28 faces the first region A1. The control section 13 may perform the first pressurized discharge in which the pressurizing trace 46 is formed in the first region A1 with liquid discharged from the first ejection section 28 by pressurization. The control section 13 may feed the absorbent member 36 in the feed direction Ds from a start of the second pressurized discharge to an end of the first pressurized discharge.

Fourth Modification

Figure 10:
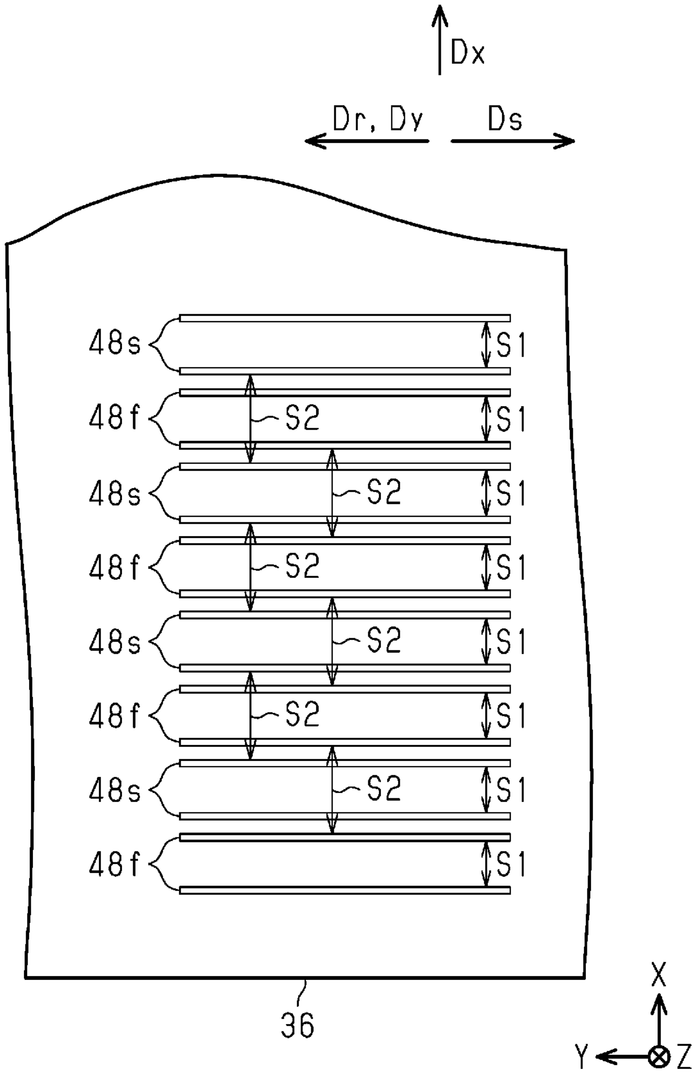
FIG. 10 is a schematic diagram of an absorbent member in which liquid is absorbed according to a control method of a fourth modification.

As shown in FIG. 10, the control section 13 may perform flushing of the first ejection section 28 and flushing of the second ejection section 29 at the same position in the feed direction Ds. The plurality of nozzle arrays L may eject liquid to different positions. For example, the first ejection section 28 may form first ejection traces **48*f* by ejecting liquid from the plurality of nozzle arrays L at a same timing. The second ejection section 29 may form the second ejection traces 48*s* by ejecting liquid from the plurality of nozzle arrays L at the same timing. The control section 13 may perform flushing at intervals smaller than the first interval S1 or the second interval S2 so as to locate the second ejection traces 48*s* between the first ejection traces 48*f***.

Fifth Modification

Figure 11:
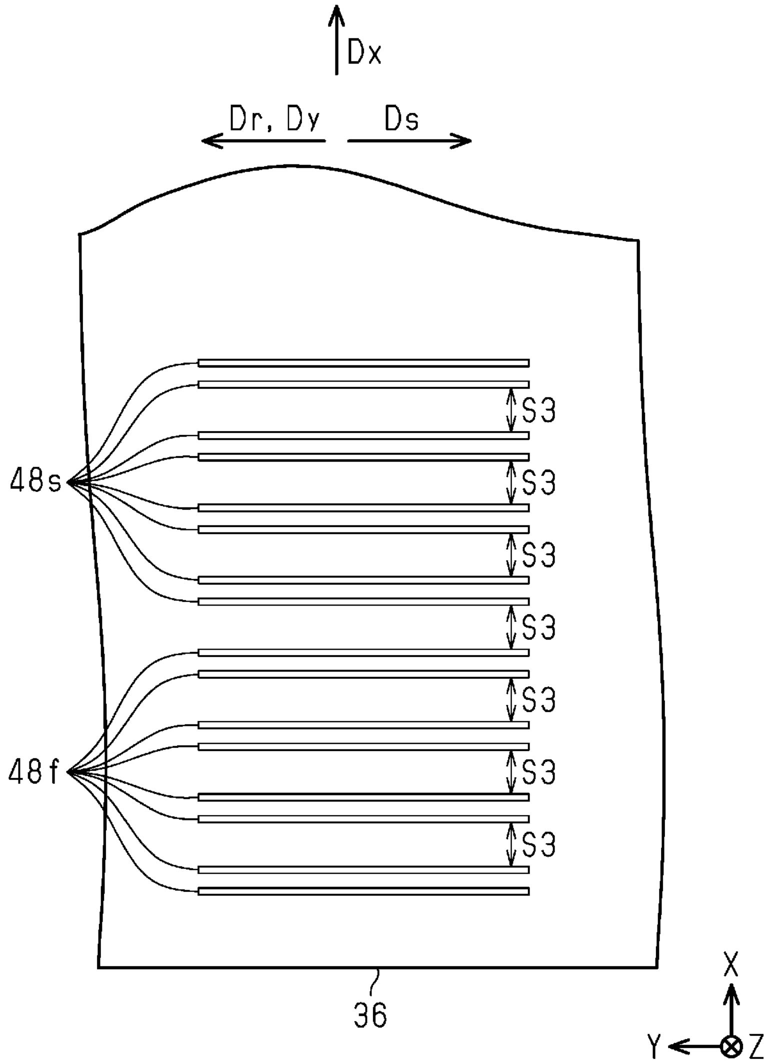
FIG. 11 is a schematic diagram of an absorbent member in which liquid is absorbed according to a control method of a fifth modification.

As shown in FIG. 11, the control section 13 may perform flushing of the first ejection section 28 and flushing of the second ejection section 29 at different positions in the scanning direction Dx. The control section 13 may control an ejection timing for each nozzle group. The control section 13 may perform flushing so that the third interval S3 between the ejection traces 48 formed by different nozzle groups is smaller than the first interval S1 or the second interval S2.

Other Modifications

- The liquid ejection device 11 may be a serial printer that scans the medium 16, or may be a line printer that can simultaneously eject liquid across a width of the medium 16.
- The number of the ejection sections included in the liquid ejection head 21 may be one.
- The number of nozzle arrays L included in the liquid ejection head 21 may be two.
- The liquid ejection device 11 may include a receiving section (not shown) for receiving the liquid discharged by pressurization, separate from the wiping section 22. The absorbent member 36 for wiping the nozzle surface 33 may receive liquid discharged by flushing.
- The liquid ejection device 11 may include a receiving section (not shown) for receiving the liquid discharged by flushing from the wiping section 22. The absorbent member 36 for wiping the nozzle surface 33 may receive liquid discharged by pressurized discharge.
- When wiping is performed after liquid is discharged by flushing, the control section 13 may perform wiping after moving the absorbent member 36 in the return direction Dr opposite to the feed direction Ds. The control section 13 may move the absorbent member 36 in the return direction Dr before moving the liquid ejection head 21 in the sub-scanning direction Dy. The control section 13 may perform the wiping of the liquid ejection head 21 after moving the unused region to the wiping region Aw.
- The wiping section 22 may not move the absorbent member 36 in the return direction Dr.
- In the wiping section 22, the pressing roller 44 may be movable in the sub-scanning direction Dy and in the opposite direction to the sub-scanning direction Dy. The wiping section 22 may move the wiping region Aw by moving the pressing roller 44. The control section 13 may wipe the nozzle surface 33 in the wiping region Aw after bringing the wiping region Aw close to the ejection trace 48 or the pressurizing trace 46.
- The control section 13 may perform pressurized discharge in a state in which the absorbent member 36 is stopped.
- The control section 13 may perform pressurized discharge while moving the liquid ejection head 21 in the sub-scanning direction Dy or in a direction opposite to the sub-scanning direction Dy.
- The control section 13 may perform pressurized discharge while moving the liquid ejection head 21 in the scanning direction Dx or in the direction opposite to the scanning direction Dx.
- The control section 13 may collectively perform pressurized discharge of all the nozzle arrays L included in the liquid ejection head 21.
- The control section 13 may perform pressurized discharge of the plurality of nozzle arrays L for one array or a plurality of arrays at a time.
- When the nozzle surface 33 is wiped by the absorbent member 36, both the liquid ejection head 21 and the wiping section 22 may move relative to each other in the sub-scanning direction Dy. One of the liquid ejection head 21 and the wiping section 22 may move in the sub-scanning direction Dy and the other may move in a direction opposite to the sub-scanning direction Dy.

When the nozzle surface 33 is wiped by the absorbent member 36, the wiping section 22 may relatively move in the sub-scanning direction Dy by moving with respect to the stopped liquid ejection head 21. The wiping section 22 may move in the sub-scanning direction Dy to wipe the nozzle surface 33. That is, the wiping section 22 may move relative to the liquid ejection head 21 in the sub-scanning direction Dy. The wiping section 22 may move in a direction opposite to the sub-scanning direction Dy to wipe the nozzle surface 33. That is, the wiping section 22 may relatively move in a direction opposite to the sub-scanning direction Dy with respect to the liquid ejection head 21. In this case, the movement mechanism 24 may not include the vertical shaft 26. In other words, the movement mechanism 24 may be configured to reciprocate the carriage 18 only in the scanning direction Dx along the horizontal shaft 25. In this case, the support section 15 may be configured to be movable in the sub-scanning direction Dy, and an image may be recorded on the medium 16 by ejecting liquid from the liquid ejection head 21 that moves in the scanning direction Dx onto the medium 16 supported by the moving support section 15. Also in such a configuration, it can be said that the liquid ejection head 21 and the wiping section 22 are relatively movable in the scanning direction Dx and in the sub-scanning direction Dy.

The liquid ejection device 11 may be a liquid ejection device that jets or ejects liquid other than ink. The state of the liquid discharged from the liquid ejection device in the form of minute droplets includes a granular state, a teardrop state, and a thread-like state with a tail. Here, the liquid may be any material that can be ejected from the liquid ejection device. For example, the liquid can be any substance when in its liquid phase, and includes a fluid body such as a liquid body having high or low viscosity, sol, gel water, other inorganic solvents, organic solvents, solutions, liquid resins, liquid metals, and metal melts. The liquid includes not only a liquid as one state of a substance but also a substance in which particles of a functional material composed of a solid such as a pigment or metal particles are dissolved, dispersed, or mixed in a solvent. Typical examples of the liquid include ink as described in the above embodiments, liquid crystal, and the like. Here, the ink includes general water-based ink and oil-based ink, and various liquid compositions such as gel ink and hot-melt ink. Specific examples of the liquid ejection device are an apparatuses that eject a liquid containing a material, such as a color material or an electrode material in a dispersed or dissolved form, the material being used for manufacturing a liquid crystal display, an electroluminescence display, a surface emitting display, a color filter, or the like. The liquid ejection device may be an apparatus that ejects a bioorganic substance used for manufacturing biochips, an apparatus used as a precision pipette for ejecting a liquid serving as a sample, a textile printer, a microdispenser, or the like. The liquid ejection device may be an apparatus that ejects a lubricating oil to a precision machine such as a watch or a camera in a pinpoint manner, or an apparatus that discharges a transparent resin liquid, such as an ultraviolet curable resin, onto a substrate in order to form a micro-hemispherical lens, an optical lens, or the like that is used in an optical communication element or the like. The liquid ejection device may be an apparatus that ejects an etching liquid such as an acid or an alkali in order to etch a substrate or the like.

Definition

The expression “at least one” as used herein means “one or more” of the desired alternatives. As an example, the expression “at least one” as used herein means “only one option” or “both of two options” if the number of options is two. As another example, the expression “at least one” as used herein means “only one option” or “any combination of two or more options” if the number of options is three or more.

Note

Hereinafter, technical ideas grasped from the above-described embodiment and modifications, and operations and effects thereof, will be described.

(A) A liquid ejection device control method is for a liquid ejection device including a liquid ejection head having a nozzle surface in which a plurality of nozzle arrays is formed by a plurality of nozzles for ejecting liquid and a wiping section which has an absorbent member configured to absorb liquid, wherein the liquid ejection head and the wiping section are relatively movable in a scanning direction and in a sub-scanning direction; the nozzle arrays extend in the sub-scanning direction and are formed at predetermined intervals in the scanning direction; and the wiping section is set with, at different positions from each other, a wiping region in which the absorbent member wipes the nozzle surface of the liquid ejection head during relative movement in the sub-scanning direction and a receiving region in which the absorbent member receives liquid discharged from the plurality of nozzle arrays, the control method including: performing flushing which includes ejecting liquid from each of the plurality of nozzle arrays into the receiving region at intervals in the scanning direction that are smaller than the predetermined intervals.

According to this method, the absorbent member for wiping the nozzle surface receives liquid discharged by flushing. The liquid ejection head performs flushing by ejecting liquid at intervals smaller than the intervals of the plurality of nozzle arrays. Therefore, it is possible to efficiently consume the absorbent member compared to a case where the liquid is ejected at intervals equal to or larger than the interval between the nozzle arrays.

(B) A liquid ejection device control method may be such that the flushing includes ejecting liquid from the plurality of nozzle arrays to overlap on a first position in the receiving region and after the amount of liquid ejected to the first position reaches a threshold, ejecting liquid from the plurality of nozzle arrays to overlap on a second position different from the first position in the scanning direction.

According to this method, the liquid ejection device ejects liquid from the plurality of nozzle arrays to overlap on the first position. That is, the liquid ejection head performs flushing by setting the interval at which liquid is ejected from the plurality of nozzle arrays to zero. Therefore, the absorbent member can be consumed more efficiently than when liquid is ejected from the plurality of nozzle arrays at intervals. After liquid ejected to the first position reaches the threshold, the liquid ejection head ejects liquid to the second position. Therefore, it is possible to reduce the possibility that liquid in an amount equal to or larger than an amount that can be received at the first position is ejected to the first position.

(C) A liquid ejection device control method, when the liquid ejection device further includes a pressurizing section configured to pressurize liquid in the nozzles of each of the plurality of nozzle arrays may further include performing pressurized discharge, the pressurized discharge including at a first pressurized discharge timing, discharging liquid to a first region of the absorbent member by using the pressurizing section to pressurize liquid in a plurality of nozzles of a nozzle array that is the target of a first pressurized discharge and at a second pressurized discharge timing, discharging liquid to a second region different from the first region of the absorbent member by using the pressurizing section to pressurize liquid in a plurality of nozzles of a nozzle array that is the target of a second pressurized discharge, wherein at least a part of the second region overlaps with the first region as viewed in the scanning direction; and the second region does not overlap with the first region as viewed in the sub-scanning direction.

According to this method, the absorbent member receives liquid discharged by pressurized discharge. Liquid is discharged to the first region at the first pressurized discharge timing. Liquid is discharged to the second region at the second pressurized discharge timing. Since the first region and the second region overlap at least partially as viewed in the scanning direction, the absorbent member can be consumed more efficiently than when the first region and the second region do not overlap. Since the first region and the second region do not overlap each other as viewed in the sub-scanning direction, it is possible to reduce the possibility of occurrence of a region in which more than an receivable amount of liquid is discharged.

(D) A liquid ejection device control method may be such that at least one of the first pressurized discharge and the second pressurized discharge is performed while feeding the absorbent member in a feed direction.

According to this method, pressurized discharge is performed while feeding the absorbent member in the feed direction. Since the position at which the absorbent member receives liquid changes, it is possible to suppress liquid from overflowing from the absorbent member due to the absorbent member not being able to absorb enough of the liquid.

(E) A liquid ejection device control method may be such that the flushing is performed so that liquid is ejected to a position not overlapping with the first region and the second region as viewed in the scanning direction.

According to this method, flushing is performed at a position not overlapping with the first region and the second region as viewed in the scanning direction. Therefore, a region where liquid is ejected by flushing and a region where liquid is discharged by pressurized discharge can be separated by a simple control.

(F) A liquid ejection device control method may be such that the flushing is performed from one end side to the other end side of the absorbent member in the scanning direction.

According to this method, flushing is performed from one end side to the other end side of the absorbent member in the scanning direction. Therefore, the absorbent member can be consumed more efficiently than in the case where flushing is performed in a part of the scanning direction.

(G) A liquid ejection device control method may be such that the pressurized discharge is performed from one end side to the other end side of the absorbent member in the scanning direction.

According to this method, pressurized discharge is performed from one end side to the other end side of the absorbent member in the scanning direction. Therefore, the absorbent member can be consumed more efficiently than in the case where pressurized discharge is performed in a part of the scanning direction.

(H) A liquid ejection device control method may be such that the flushing is performed to eject the liquid to a position overlapping at least one of the first region and the second region as viewed in the scanning direction.

According to this method, flushing is performed at a position overlapping at least one of the first region and the second region as viewed in the scanning direction. Therefore, the absorbent member can be consumed more efficiently than in the case where flushing is performed at a position not overlapping with the first region and the second region in the scanning direction.

(I) A liquid ejection device control method may be such that the flushing and the pressurized discharge are performed from one end side to the other end side of the absorbent member in the scanning direction.

According to this method, flushing and pressurized discharge are performed from one end side to the other end side of the absorbent member in the scanning direction. Therefore, the absorbent member can be consumed more efficiently than in the case where pressurized discharge is performed in a part of the scanning direction.

(J) A liquid ejection device control method may be such that the absorbent member is movable in a feed direction, after liquid is discharged from the plurality of nozzles to the absorbent member, moving an unused region of the absorbent member, which has not received the liquid, to the wiping region by moving the absorbent member in a direction opposite to the feed direction, and wiping the nozzle surface with the wiping region.

According to this method, the nozzle surface is wiped by moving the unused region of the absorbent member to the wiping region. Since the unused region of the absorbent member can be reduced, the absorbent member can be efficiently consumed.

(K) A liquid ejection device control method is for a liquid ejection device including a liquid ejection head having a nozzle surface in which a plurality of nozzle arrays is formed by a plurality of nozzles for ejecting liquid; a wiping section which has an absorbent member configured to absorb liquid; and a pressurizing section configured to pressurize liquid in the nozzles of each of the plurality of nozzle arrays, wherein the liquid ejection head and the wiping section are relatively movable in a scanning direction and in a sub-scanning direction; the nozzle arrays extend in the sub-scanning direction and are formed at predetermined intervals in the scanning direction; and the wiping section is set with, at different positions from each other, a wiping region in which the absorbent member wipes the nozzle surface of the liquid ejection head during relative movement in the sub-scanning direction and a receiving region in which the absorbent member receives liquid discharged from the plurality of nozzle arrays, the control method including: performing pressurized discharge, the pressurized discharge including at a first pressurized discharge timing, discharging liquid to a first region of the absorbent member by using the pressurizing section to pressurize liquid in a plurality of nozzles of a nozzle array that is the target of a first pressurized discharge and at a second pressurized discharge timing, discharging liquid to a second region different from the first region of the absorbent member by using the pressurizing section to pressurize liquid in a plurality of nozzles of a nozzle array that is the target of a second pressurized discharge, wherein at least a part of the second region overlaps with the first region as viewed in the scanning direction; and the second region does not overlap with the first region as viewed in the sub-scanning direction.

According to this method, the absorbent member for wiping the nozzle surface receives liquid discharged by pressurized discharge. Liquid is discharged to the first region at the first pressurized discharge timing. Liquid is discharged to the second region at the second pressurized discharge timing. Since the first region and the second region do not overlap each other as viewed in the sub-scanning direction, it is possible to reduce the possibility of occurrence of a region in which more than an receivable amount of liquid is discharged. Since the first region and the second region overlap at least partially as viewed in the scanning direction, the absorbent member can be consumed more efficiently than when the first region and the second region do not overlap.

(L) A liquid ejection device includes a liquid ejection head having a nozzle surface in which a plurality of nozzle arrays is formed by a plurality of nozzles for ejecting liquid; a wiping section which has an absorbent member configured to absorb liquid; and a control section, wherein the liquid ejection head and the wiping section are relatively movable in a scanning direction and in a sub-scanning direction; the nozzle arrays extend in the sub-scanning direction and are formed at predetermined intervals in the scanning direction; in the relative movement in the sub-scanning direction, the wiping section is set at a different position between a wiping region in which the absorbent member wipes the nozzle surface of the liquid ejection head and a receiving region in which the absorbent member receives liquid discharged from the plurality of nozzle arrays; and the control section causes ejection of liquid from each of the plurality of nozzle arrays into the receiving region at intervals in the scanning direction that are smaller than the predetermined intervals.

According to this configuration, the same effects as that of the above-described control method for the liquid ejection device can be obtained. The absorbent member for wiping the nozzle surface receives liquid discharged by ejecting from the plurality of nozzle arrays. The control section ejects liquid at intervals smaller than the intervals of the plurality of nozzle arrays. Therefore, it is possible to efficiently consume the absorbent member compared to a case where liquid is ejected at intervals equal to or larger than the intervals between the nozzle arrays.

What is claimed is:

1. A liquid ejection device control method for a liquid ejection device including
- a liquid ejection head having a nozzle surface in which a plurality of nozzle arrays is formed by a plurality of nozzles for ejecting liquid, the liquid ejection head being configured to record an image on a medium by ejecting liquid from the plurality of nozzles;
- a wiping section which has an absorbent member configured to absorb liquid, the wiping section being provided at a position adjacent to a support section supporting the medium, wherein the liquid ejection head is movable relative to the wiping section in a scanning direction and in a sub-scanning direction; and
- a pressurizing section provided outside the liquid ejection head, the pressurizing section configured to supply pressurized liquid to the liquid ejection head and pressurize liquid in the nozzles of each of the plurality of nozzle arrays;
- the nozzle arrays extend in the sub-scanning direction and are formed at predetermined intervals in the scanning direction; and
- the wiping section is set with, at different positions from each other, a wiping region in which the absorbent member wipes the nozzle surface of the liquid ejection head during movement in the sub-scanning direction of the liquid ejection head and a receiving region in which the absorbent member receives liquid discharged from the plurality of nozzle arrays, the control method comprising:
- performing flushing which includes:
- ejecting liquid from the plurality of nozzles of the nozzle array to overlap in the sub-scanning direction within the receiving region; and
- ejecting liquid from each of the plurality of nozzle arrays in the receiving region at intervals in the scanning direction that are smaller than the predetermined intervals; and
- performing pressurized discharge,
  - the pressurized discharge including discharging liquid to an absorbent member by using the pressurizing section to pressurize liquid in a plurality of nozzles of the nozzle array, wherein
  - when the flushing is performed, an ejection trace is formed on the absorbent member,
  - when the pressurized discharge is performed, a pressurizing trace is formed on the absorbent member, and wherein
  - in the scanning direction, a size of margin from an end of the absorbent member to the ejection trace is smaller than a size of margin from the end of the absorbent member to the pressurizing trace.

2. The liquid ejection device control method according to claim 1, wherein the flushing includes
- ejecting liquid from the plurality of nozzle arrays to overlap on a first position in the receiving region and
- after an amount of liquid ejected to the first position reaches a threshold, ejecting liquid from the plurality of nozzle arrays to overlap on a second position different from the first position in the scanning direction.

3. The liquid ejection device control method according to claim 1, wherein
- the pressurized discharge including
  - at a first pressurized discharge timing, discharging liquid to a first region of the absorbent member by using the pressurizing section to pressurize liquid in a plurality of nozzles of the nozzle array that is a target of a first pressurized discharge and
  - at a second pressurized discharge timing, discharging liquid to a second region different from the first region of the absorbent member by using the pressurizing section to pressurize liquid in a plurality of nozzles of the nozzle array that is the target of a second pressurized discharge, wherein
  - at least a part of the second region overlaps with the first region as viewed in the scanning direction; and
  - the second region does not overlap with the first region as viewed in the sub-scanning direction.

4. The liquid ejection device control method according to claim 3, wherein
- at least one of the first pressurized discharge and the second pressurized discharge is performed while feeding the absorbent member in a feed direction.

5. The liquid ejection device control method according to claim 3, wherein
- the flushing is performed so that liquid is ejected to a position not overlapping with the first region and the second region as viewed in the scanning direction.

6. The liquid ejection device control method according to claim 5, wherein the flushing is performed from one end side to an other end side of the absorbent member in the scanning direction.

7. The liquid ejection device control method according to claim 5, wherein the pressurized discharge is performed from one end side to an other end side of the absorbent member in the scanning direction.

8. The liquid ejection device control method according to claim 3, wherein the flushing is performed to eject the liquid to a position overlapping at least one of the first region and the second region as viewed in the scanning direction.

9. The liquid ejection device control method according to claim 8, wherein the flushing and the pressurized discharge are performed from one end side to the other end side of the absorbent member in the scanning direction.

10. The liquid ejection device control method according to claim 1, wherein the absorbent member is movable in a feed direction, the control method further comprising:

after liquid is discharged from the plurality of nozzles to the absorbent member, moving an unused region of the absorbent member, which has not received the liquid, to the wiping region by moving the absorbent member in a direction opposite to the feed direction, and wiping the nozzle surface with the wiping region.

11. The liquid ejection device control method according to claim 1, wherein the flushing includes:

ejecting liquid from the plurality of nozzle arrays to overlap on a first position in the receiving region; and after an amount of liquid ejected to the first position reaches a threshold, ejecting liquid from the plurality of nozzle arrays to overlap on a second position different from the first position in the scanning direction, a threshed being the amount of liquid that can be absorbed by the absorbent member at the first position.

12. The liquid ejection device control method according to claim 1, wherein the receiving region of the absorbent member extends from wiping region to a guide roller which guides the absorbent member.

13. The liquid ejection device control method according to claim 1, wherein the flushing includes:

ejecting liquid from the plurality of nozzle arrays onto the absorbent member at a first position in the receiving region, wherein the liquid ejected from the plurality of nozzle arrays overlap at the first position; and after an amount of liquid ejected to the first position reaches a threshold, ejecting liquid from the plurality of nozzle arrays to overlap on a second position different from the first position in the scanning direction.

14. The liquid ejection device control method according to claim 1, wherein the flushing includes:

ejecting liquid from the plurality of nozzle arrays onto the absorbent member at a first position in the receiving region, wherein the liquid ejected from the plurality of nozzle arrays overlap at the first position; and after an amount of liquid ejected to the first position reaches a threshold, ejecting liquid from the plurality of nozzle arrays to overlap on a second position different from the first position in the scanning direction, a threshed being the amount of liquid that can be absorbed by the absorbent member at the first position.

15. The liquid ejection device control method according to claim 1, wherein the flushing is performed by the liquid ejection head moving in the scanning direction in a state where the absorbent member is not moving, and wiping the nozzle surface of the liquid ejection head with the absorbent member is performed in a state where the absorbent member is not moving and is pressed against the nozzle surface.

16. The liquid ejection device control method according to claim 1, wherein when the flushing is performed, an ejection trace in which a plurality of linear traces extending along the sub-scanning direction are arranged at intervals in the scanning direction is formed on the absorbent member.

17. The liquid ejection device control method according to claim 1, wherein the pressurized discharge is performed while feeding the absorbent member in a feed direction along the sub-scanning direction.

* * * * *